United States Patent Office 3,758,447
Patented Sept. 11, 1973

3,758,447
FREE RADICAL POLYMERIZATION USING PERFLUOROALKYL MERCAPTANS AS CHAIN TRANSFER AGENTS
Robert Allan Falk, New City, and Eduard Karl Kleiner, New York, N.Y., assignors to Ciba-Geigy Corporation, Ardsley, N.Y.
No Drawing. Filed Nov. 17, 1971, Ser. No. 199,791
Int. Cl. C08f 15/16
U.S. Cl. 260—78.5 B
18 Claims

ABSTRACT OF THE DISCLOSURE

Polymers having low free surface energies are derived from monomers which are capable of free radical polymerization and novel perfluoroalkyl mercaptans which act as chain transfer agents.

---

The present invention is directed to the formation of polymers which contain perfluoroalkyl groups. These perfluoroalkyl groups lower the free surface energy of the polymer. This application incorporates by reference the subject matter of co-pending application Ser. No. 199,715 filed Nov. 17, 1971, also identified herein as FCR-10.

It is well known that every polymer surface or polymer film has a certain critical surface tension or $\gamma_c$-value, measured in dynes per cm. (see: Contact Angle, Wettability and Adhesion; Advances in Chemistry Series No. 43, ACS, Washington, D.C., 1964). It is also well known that polymers with very low critical surface tensions or low free surface energies have non-wettability characteristics, i.e. they possess oil and water repellency and are useful as finishes for textiles, paper, leather and other substrates. Polymers having these low critical surface tensions are generally derived from monomers such as acrylates, methacrylates, vinyl esters, fumarates, etc. which contain perfluoroalkyl groups of the type $C_nF_{2n+1}$— wherein $n$ has an optimum value of 6 to 12. Two typical monomers from which commercial soil repellent textile finishes (Scotchgard and Zepel) are derived include:

$$CH_2=C(CH_3)COOCH_2CH_2C_nF_{2n+1}$$

$$CH_2=C(CH_3)COOCH_2CH_2N(C_2H_5)SO_2C_nF_{2n+1}$$

In contrast to the prior art teachings, it was now found that the critical surface tension of a polymer which is obtained from a monomer via a free radical polymerization reaction, can be drastically reduced, if the polymerization of such monomer is carried out in the presence of novel perfluoroalkyl ($R_f$) containing mercaptans which act as chain transfer agents and therefore are built into the polymer chain.

Due to the availabilty of an enormous number of monomers which do polymerize via a free radical mechanism, it is possible to likewise obtain an enormous number of low critical surface tension polymers. The polymers of this disclosure which contain a moiety derived from novel $R_f$-group containing mercaptans may have essentially identical solid state and chemical properties as the corresponding polymers without the inclusion of the novel $R_f$-groups. Therefore when the chain transfer agent is employed at low concentrations, the distinguishing polymer characteristic will reside in the critical surface tension. However if relatively large amounts of the chain transfer agent are employed during polymerization some changes in properties will result in conjunction with the lowering of the critical surface tension.

In addition it has been found that very small amounts of the novel mercaptans reduce the critical surface tensions very drastically, a most important factor if one considers the generally high price of perfluoroalkyl group containing moieties. These two facts, (a) the convertibility of a wide spectrum of polymers into analogous low surface tension polymers and (b) the high efficiency based on the percentage of perfluoroalkyl groups employed, makes this approach of preparing low surface energy polymers superior and more economical than the classical approach as outlined above. The novel low free surface tension polymers are most useful as soil repellent finishes for substrates generally including textiles, paper, leather etc. and other applications where non-wettability is required.

This invention provides polymers with a reduced surface tension by introduction into the polymer chain of a moiety derived from a perfluoroalkyl ($R_f$) group containing mercaptan. The $R_f$ mercaptans employed herein are disclosed in copending application, FCR-10, filed concurrently and may be obtained by a base or free radical catalyzed addition of hydrogen sulfide or mercaptans to perfluoroalkyl group containing esters of fumaric, maleic, citraconic, mesaconic, itaconic, methylene malonic and aconitic acids.

The formation of the polymers involves free radical polymerization in the presence of the disclosed $R_f$-group mercaptans which function as chain transfer agents and are incorporated into the polymer chain.

A small amount of the moiety from the perfluoroalkyl-mercaptans need normally be present in the polymer chain to obtain a significant reduction in free surface tension. With the perfluoroalkyl containing moiety in a relatively small quantity, the remaining physical as well as the chemical properties of the polymer will be essentially unaffected by this constituent. In contrast relatively large portions of the perfluoroalkyl moieties in the polymer chains will cause some changes in the polymer properties.

The polymers of this disclosure may be utilized as surface finishes for substrates generally such as leather, textiles, paper, wood masonry, metals, plastic, glass, painted surfaces and the like. The composition may be applied in polymeric form to the base material. An alternative technique involves polymerization in the presence of the base material with simultaneous adhesion to the base.

The polymeric composition with reduced free surface tension need not be employed as surface finishes to other materials but may be utilized to form free standing articles per se including films and fibers. The polymeric composition may be directly molded into a desired shape. The choice of starting monomers will be dictated by the desired final properties such as tensile strength, thermostability, flexibility, etc. However by introduction of the perfluoroalkyl group into the polymer chain, reduction in surface tension will take place.

The $R_f$-containing mercaptans involved as chain transfer agents for use during the free radical polymerization are disclosed in FCR-10 and are of the following types:

(I)
$$\left[ \begin{array}{c} R_fA \\ \diagdown \\ \diagup \\ R^3 \end{array} CH-\underset{\underset{R^2}{|}}{\overset{\overset{R^1}{|}}{C}}-S \right]_m -B-[SH]_n$$

and (II)
$$\begin{array}{c} R_fA \\ \diagdown \\ \diagup \\ R^3 \end{array} CH-\underset{\underset{R^2}{|}}{\overset{\overset{R^1}{|}}{C}}-SH$$

wherein $R^1$, $R^2$ and $R^3$ are hydrogen, methyl, $R_fA$ or $R_fACH_2$ with the requirement that at least one or two of $R^1$, $R^2$ and $R^3$ represent $R_fA$ or $R_fACH_2$, $R_f$ is a perfluoroalkyl group of 2 to 18 carbon atoms and more preferably 6 to 12 carbon atoms;

AR_f is

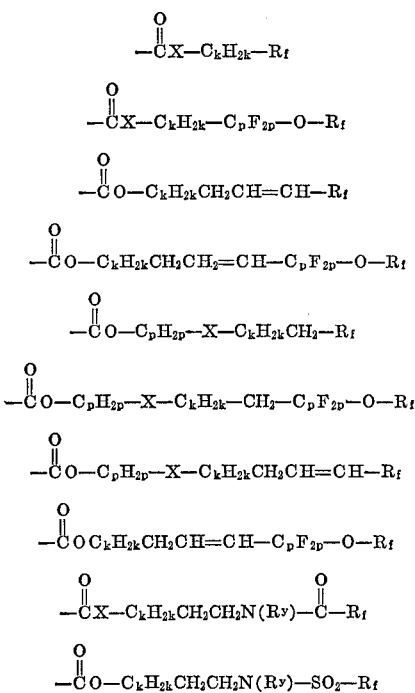

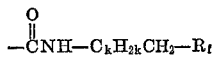

or $$-\overset{O}{\underset{\|}{C}}NH-C_kH_{2k}CH_2-R_f$$

X is oxygen or sulfur;
k is zero to 10;
p is 2 to 12;
R^y is hydrogen or alkyl of 1 to 4 carbon atoms;
B is an inert linkage group;
m is 1 to 10;
n is 1 to 9.

In the above definition for Formula I, B is required to be an inert linkage group. In this application the letters "B" and "J" denote identical inert linkage groups and are used interchangeably. Inert in the present context is employed in its normal definition so that B remains as a discrete unreacted group in the starting and final compounds. It wlil be immediately recognized that a wide variety of connecting groups may be represented by B which serves the function of coupling the sulfur atoms.

The perfluoroalkyl mercaptans of types I and II are employed as chain transfer agents in the free radical catalyzed polymerization of monomers such as vinyl and related compounds to yield novel perfluoroalkyl group containing polymers with lowered free surface energy characteristics which are useful in many applications particularly soil repellent finishes. It is well known (see i.e. C. Walling, Free Radicals in Solution, chapters 4 and 7; John Wiley and Sons, Inc., New York 1963) that mercaptans act as chain transfer agents in free radical polymerizations and become an integral part of the polymer chain according to the following equations:

   (a-1)

   (a-2)

   (b)

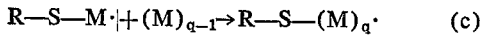   (c)

According to Equations (a) to (c), hydrogen is abstracted from a mercaptan (R—SH) by a polymer radical ( ⌇M·) or initiator radical (I·) and a thiyl radical (R—S·) is thus formed. This thiyl radical adds to a vinyl or related polymerizable monomer or combination of different polymerizable monomers, M to start a new polymer chain (R—S—H· and R—S—(M)_q·), where q represents an integer greater than one. The mercaptan functions to introduce a terminal moiety in the polymer chain.

Similarly, dimercaptans form dithiyl radicals

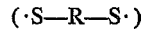

which add monomers

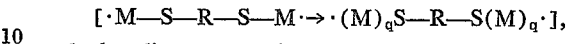

and the dimercaptan becomes a central moiety of a linear polymer chain whereas a tri- or polymercaptan forms a di- or polythiyl radical which becomes a central moiety in a branched or so-called star polymer:

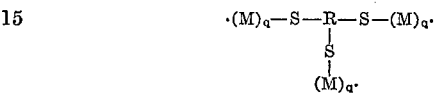

In the above formula it will be understood that the various q numerical values need not be identical. Therefore if the novel R_f-mercaptans of type I are employed as chain transfer agents in free radical polymerization, polymers are obtained having either terminal or central R_f-group containing moieties with the following general structures:

(III)

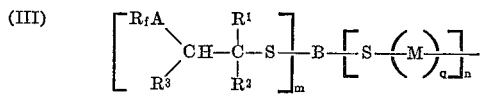

wherein $R^1$, $R^2$, $R^3$, $R_f$, A, q and n have been previously defined in conjunction with Formula I. M is a moiety derived from free radical polymerizable monomers or combination of different polymerizable monomers, and q is an integer greater than one. No absolute criticality lies in the value of q, hence very short or very long chains may be obtained. However, a practical upper limit for q is considered to be $10^4$.

If free radical polymerization occurs in the presence of a chain transfer agent of type II, the following polymer will be realized:

(IV)

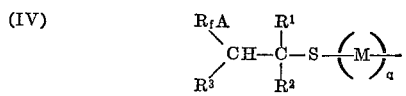

wherein $R^1$, $R^2$, $R^3$, $R_f$, A, M and q have been previously defined.

Thus in type III and IV polymers, it will be readily seen that M may be any monomer or combination of different monomers which undergo a free radical polymerization and in the polymerization step will have introduced by chain transfer the radicals of type Ia and IIa namely:

(Ia)

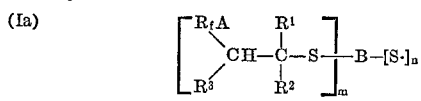

and (IIa)

The types of polymerizable groups and hence the polymers that may be employed in conjunction with the perfluoroalkyl ($R_f$) containing mono- or polymercaptans are numerous. The sole criticality is that free radical polymmerization occurs. Therefore in the presence of the disclosed mercaptans, chain transfer will take place and the moiety of type Ia and IIa will be introduced as a constituent of the chain. The basic reaction of mercaptans of the formula RSH involving chain transfer is considered well documented in the literature.

Monomers of interest are generally all monomer moieties which can be polymerized with free radical initiators and can therefore be employed for the synthesis of polymers of Formula III and IV. An excellent survey of vinyl and related monomers which polymerize with free radical initiators are listed in C. E. Schildknecht, Vinyl and Related Polymers (John Wiley and Sons, Inc., New York, 1952) and Houben-Weyl, Methoden der Organischen Chemie, vol. 14/1 (Georg Thieme Verlag, Stuttgart, 1961). A desired class of monomers therefore can be considered to be those possessing ethylenic unsaturation.

The free radical catalyzed polymerization is coupled with the chain transfer process wherein the mercaptan derived moiety is introduced as an integral part of the chain. As previously discussed the basic reaction is well documented in the prior art literature. Reference is made to the following teachings for further discussion which would involve free radical polymerization coupled with a chain transfer step:

Encyclopedia of Polymer Science and Technology, volume 3, pages 575–610, and especially page 585. (Interscience Publishers, Division of John Wiley & Sons, Inc., New York 1965). This encyclopedia refers to over 100 other literature teachings of the free radical polymerization coupled with a chain transfer step.

The class of polymers encompassed within the scope of this disclosure are those formed by monomers undergoing free radical polymerization and contain the perfluoroalkyl moiety of Formulas Ia and IIa.

These mercaptans of types I and II are characterized by the fact that they contain at least one and preferably several pairs or triplets of closely packed $R_f$-groups per SH-group. This fact is most important since closely packed pairs or triplets of $R_f$-groups have been found to yield polymers having considerably lower critical surface tensions and therefore higher oil repellency levels if compared with analogous polymers derived from a mercaptan containing just one $R_f$-group or $R_f$-groups which are not closely packed but separated by one or more backbone carbons. Equations a and c illustrate polymers of the present invention with at least two closely spaced $R_f$-groups. In contrast equation b shows a polymer which does not have this closeness of spacing of the $R_f$-groups. As will be later shown, examples a and c have a lower critical surface tension than b.

(a)
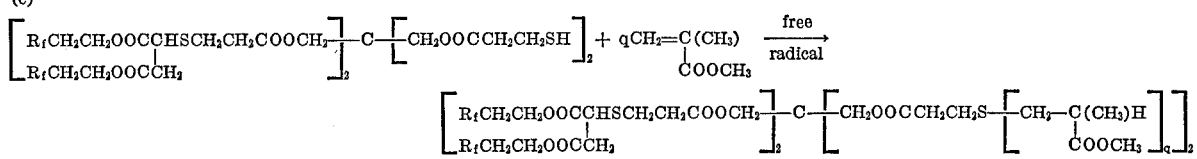

(b)

(c)

The esters of the type V are derived from fumaric, maleic, citraconic, mesaconic, methylene malonic, itaconic and aconitic acids.

The following polymercaptans are considered illustrative of the linkage group B where $B^1$ and $B^{11}$ represent respectively di and higher mercaptans, (a) Dimercaptans $B^1$ - $(SH)_2$, wherein $B^1$ may be: alkylene; alkylene - O - alkylene-; alkylene - S - alkylene; alkylene-$CO_2$ - alkylene - $O_2C$ - alkylene, cyclohexylene, phenylene, naphthylene, phenylene-dimethylene, biphenylylene, phenylene O-phenylene, phenylene - S - phenylene. Preferred dimercaptans of this type are: 1,2-ethanedithiol; 1,4-butanedithiol, 1,8-octanedithiol; 2,2′-oxydiethanethiol, 2,2′-oxydiethanethiol, 2,2′-thiodiethanethiol; ethylene-bis-thioglycolate ethylene-bis-thiopropionate, 3,4-dimercaptotoluene, xylylenedithiol, hydroquinonedithiol, biphenyl-4, 4′-dithiol, phenoxybenzene-4,4′dithiol.

(b) Polymercaptans $B^{11}$-$(SH)_{3\ to\ 10}$ are more complex mercaptans and most important are: esters of thioglycolic and mercaptopropionic acid and polyhydroxy compounds with 3 to 10 hydroxy groups as the following examples show:

Pentaerythritol tetra(3-mercaptopropionate)

$$C(CH_2OOCCH_2CH_2SH)_4$$

Pentaerythritol tetrathioglycolate $$C(CH_2OOCCH_2SH)_4$$

Trimethylolethane tri(3-mercaptopropionate)

$$CH_3C(CH_2OOCCH_2CH_2SH)_3$$

Trimethylolethane trithioglycolate $$CH_3C(CH_2OOCCH_2SH)_3$$

Trimethylolpropane tri(3-mercaptopropionate)

$$CH_3CH_2C(CH_2OOCCH_2CH_2SH)_3$$

Trimethylolpropane trithioglycolate $$CH_3CH_2C(CH_2OOCCH_2SH)_3$$

Dipentaerythritol hexathioglycolate $$—O\{CH_2—C(CH_2OOCCH_2SH)_3\}_2$$

Dipentaerythritol hexa(3-mercaptopropionate)

$$—O\{CH_2C(CH_2OOCCH_2CH_2SH)_3\}_2$$

Polymercaptans with 8 or 10 mercapto groups can be prepared by esterifying tripenta- and tetrapentaerythritol with thioglycolic and thiopropionic acid. Instead of pentaerythritol or homologs thereof, other polyhydroxy compounds such as sorbitols etc. may be employed to synthesize useful polymercaptans.

To illustrate the synthesis of the polymers of the present invention, mercaptans of type I and II are first prepared in accordance with the procedures disclosed in FCR–10, filed concurrently. Illustratively these strating compounds are prepared involving a base or free radical catalyzed addition reaction of α,β-unsaturated di or triesters of the type:

(V)
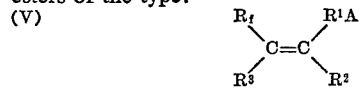

to polymercaptans of the type (IV)   B—(CH)$_q$ wherein $q$ is an integer from 1 to 10.

Another most useful class of polymercaptans are derived from mono- or polyepoxides and thioglycolic or related acids according to the following equation:

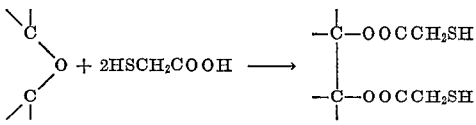

as described in the following patents: French Pat. 1,103,764, and U.S. Pat. 2,992,210.

Commercially available mono- or polyepoxides from which useful polymercaptans can be derived are described in "Encyclopedia of Polymer Science and Technology," vol. 6, pp. 209–271 (John Wiley & Sons, Inc., 1967).

A specific example is given below:

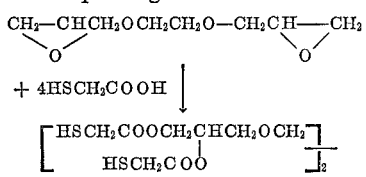

Other useful polymercaptans are: Mercapto terminated oligomers or polymers such as mercaptan terminated polybutadiene sold by B. F. Goodrich Chemical Company under the brand name of Hycar MTB or MTBN for which the following properties are given:

|  | Hycar MTB (Hycar 2000X158) [1] | Hycar MTBN (Hycar 1300X10) [2] |
|---|---|---|
| Mercaptan content, percent | 2.8 | 3.85 |
| Bound acrylonitrile, percent |  | 24.0 |
| Specific gravity, 25°/25° C | .93 | .98 |
| Brookfield viscosity, at 27° C., cps | 20,000 | 35,000 |
| Molecular weight, $M_n$ | 3,000 |  |

[1] Polybutadiene with mercaptan terminal groups.
[2] Butadiene-acrylonitrile copolymer with mercaptan terminal groups.

If hydrogen sulfide is added to esters of type V, the compound of type II is obtained. The addition of hydrogen sulfide or mercaptans to $\alpha,\beta$-unsaturated di- and triesters of type V is accomplished either by a base or free radical catalyst.

The base catalyzed addition reaction of hydrogen sulfide or mercaptan to $\alpha,\beta$-unsaturated esters is well known and described in detail in: Houben-Weyl, Methoden der Organischen Chemie, vol. 9, pp. 123 to 126 (Georg Thieme, Verlag, Stuttgart, 1955).

The preferred bases recommended for such addition reactions in amounts from 0.01 to 2% at temperatures varying from room temperatures to 100° C. are generally strong inorganic or organic bases such as: Sodium or potassium methoxide or ethoxide, benzyltrimethylammonium hydroxide, piperidine, or pyridine.

It was found, however, that the mercaptan or hydrogen sulfide can be added to $\alpha,\beta$-unsaturated di- and triesters of type V with very weak organic bases such as tertiary amines, as for instance:

triethylamine
N-methyl morpholine
triethylenediamine
N,N-dimethyl piperazine
N-ethyl morpholine
tetramethyl-1,4-butane-diamine
diethylcyclohexylamine
dimethylethanolamine
dimethylethylamine
diethylmethylamine The use of such weak bases has many advantages, such as the reduced formation of colored byproducts; the possibility of leaving the weak base in the final product simplifies the work-up procedure and reduces costs; little or no reactions occurs with solvents sensitive toward strong bases such as ketones or esters.

It is also possible to use free radical initiators for the addition of hydrogen sulfide or mercaptans of type VI to di- and triesters of type V. This is possible because the di-triesters of type V are in contrast to acrylic esters, very reluctant toward homopolymerization. A suitable catalyst may be anyone of the commonly known agents for initiating the polymerization of vinyl monomers such as azo-initiators, (e.g. azobisisobutyronitrile) or aliphatic and aromatic acyl peroxides, e.g. decanoyl peroxide, lauroyl, peroxide, benzoyl peroxide, dialkyl peroxides, e.g. t-butyl peroxide, cumyl peroxide; or hydroperoxides, e.g. t-butylhydroperoxide, cumene hydroperoxide, or peresters and peroxycarbonates, e.g. t-butyl perbenzoate.

The addition of hydrogen sulfide or the mercaptans of type VI to the di- and triesters of type V is usually carried out in a solvent in which the reactants and preferably also the adduct are soluble at the reaction temperature employed. Suitable solvents are aliphatic or aromatic hydrocarbons such as heptane, benzene, toluene, etc.; chlorinated or fluorinated aliphatic or aromatic hydrocarbons such as methylene chloride, chloroform, methyl chloroform, carbon tetrachloride, trichloroethylene, perchloroethylene, Freon's such as 1,1,2-trifluoro-1,2,2-trichloroethane, etc., chlorobenzene, benzotrifluoride or hexafluoroxylene. Ketones, esters and ethers such as acetone, methyl isobutyl ketone, ethyl acetate and higher homologs, dialkyl ethers, tetrahydrofurane, ethylene glycol monomethyl or monoethyl ether, ethylene glycol dimethyl or diethyl ether, etc. If one of the components (i.e. hydrogen sulfide, mercaptans or a solvent) boils below the reaction temperature, the reaction is desirably carried out in a pressure tube or an autoclave.

All mercaptans of types I and II are characterized by having two or three closely packed $R_f$-groups per —SH group. This fact is most important since closely packed pairs or triplets of $R_f$-groups in a molecule have been found to give considerable higher oil repellency ratings if compared with a molecule containing isolated $R_f$-groups, i.e. $R_f$-groups which are separated by one or more backbone carbon atoms.

As previously discussed the polymerization step will involve free radical polymerization with incorporation of the perfluoroalkyl derived moiety by a chain transfer step.

Monomers capable of forming polymer chains by a free radical polymerization include:

Acrylates and methacrylates with one or more carbons in the ester group, such as methyl, ethyl, propyl, isopropyl, butyl, hexyl, octyl, decyl, dodecyl, 2-ethylhexyl, octadecyl, cyclohexyl, phenyl, benzoyl, 2-ethoxyethyl, methyl polyethleneoxy, acrylate and methacrylate;

Vinyl esters with 1 to 18 carbons in the ester group, such as vinyl acetate, butyrate, laurate, stearate, 2-ethyl-hexanoate and benzoate; vinyl chloroacetate and isopropenyl acetate;

Styrene and substituted styrenes such as o- and p-methyl, 3,4-dimethyl, 3,4-diethyl and p-chlorostyrene;

Alpha olefins which include substituted alpha olefins both straight and branched with up to 18 carbon atoms in the side chain including ethylene, propylene, butylene, and derivatives containing chloro, fluoro and cyano groups such as:

Vinyl chloride, vinylidene chloride, vinyl fluoride, vinylidene fluoride, acrylonitrile, methacrylonitrile, tetrafluoroethylene, trifluorochloroethylene, hexafluoropropylene;

Dienes particularly 1,3-butadiene, isoprene, and chloroprene, 2 - fluoro - butadiene, 1,1,3 - trifluorobutadiene, 1,1,2,3-tetrafluorobutadiene, 1,1,2 - trifluoro-3,4-dichlorobutadiene and tri- and pentafluorobutadiene and isoprene;

Nitrogen-vinyl monomers such as vinyl pyridine, N-vinylimides, vinyl succinimide, vinyl pyrrolidone, and N-vinyl carbazole.

Useful copolymers containing a moiety derived from a perfluoroalkyl mercaptan are derived from vinyl ethers in combination with monomers which are known to copolymerize with the vinyl ethers by a free radical mechanism. Examples of suitable vinyl ethers are: methyl vinyl ether, isopropyl vinyl ether, isobutyl vinyl ether, 2-methoxyethyl vinyl ether, n-propyl vinyl ether, t-butyl vinyl ether, isoamyl vinyl ether, n-hexyl vinyl ether, 2-ethylbutyl vinyl ether, diisopropylmethyl vinyl ether, 1-methylheptyl vinyl ether, n-decyl vinyl ether, n-tetradecyl vinyl ether, and n-octadecyl vinyl ether.

Illustrative copolymers may be formed from esters and anhydrides of $\alpha,\beta$-unsaturated diacids such as fumarates, maleates, citraconates, mesaconates and itaconates in combination with comonomers which do copolymerize with the $\alpha,\beta$-unsaturated diesters such as vinyl esters, vinyl ethers, styrenes and $\alpha$-olefins. The preferred mentioned diesters have ester groups with 1 to 18 carbons such as methyl, ethyl, propyl, isopropyl, hexyl, and dodecyl groups.

Very important are also monomers containing reactive groups which can act as crosslinking sites during a curing cycle and therefore increase the durability properties of a textile.

Important reactive monomers are: acrylic and methacrylic acid, hydroxyalkyl acrylates and methacrylates, maleic anhydride, maleic acid, acryl- and methacrylamide, N-methylolacrylamide, t-butylaminoethyl methacrylate, hydroxyalkyl vinyl ethers. From the listed monomers the novel polymers and copolymers are obtained by simply, polymerizing these monomers in the presence of the mercaptans of types I and II in an inert atmosphere at elevated temperature employing free radical initiators and a suitable solvent if necessary.

Of special interest besides vinyl and related monomers are di- and polyvinyl and related monomers which ordinarily yield crosslinked, insoluble polymers if polymerized with free radical initiators in the absence of larger amounts of chain transfer agents. If such polyvinyl compounds are polymerized alone or together with other vinyl monomers in the presence of larger amounts of the novel mercaptans of types I and II, soluble polymers or prepolymers are obtained which have low free surface energy properties. It is, of course, also possible to obtain by this method crosslinked insoluble polymers with the desired low free surface energy properties. Prepolymers can be applied to substrates and in a second curing step catalyzed by free radicals, radiation, or UV light, be crosslinked on the substrate, yielding fast finishes.

The following polyvinyl monomers are commercially available from Sartomer Resins, Inc., Essington, Pa., and are illustrative of the many types of useful polyvinyl monomers:

allyl methacrylate
1,3-butylene glycol dimethacrylate
ethylene glycol dimethacrylate
polyethylene glycol dimethacrylate
tetraethylene glycol dimethacrylate
triethylene glycol dimethacrylate
trimethylolpropane trimethacrylate
1,3-butylene glycol diacrylate
1,4-butylene glycol diacrylate
diallyl fumarate
diethylene glycol diacrylate
diethylene glycol dimethacrylate
1,6-hexane diol diacrylate
pentaerythritol tetraacrylate
tetraethylene glycol diacrylate
trimethylolpropane triacrylate
1,4-butane dimethacrylate
diallyl maleate
2,2-dimethylpropane dimethacrylate
trimethacrylate of tris(2-hydroxyethyl) isocyanurate
ethylene glycol diacrylate
ethoxylated bisphenol A dimethacrylate
dipentaerythritol monohydroxy penta acrylate
cyclohexane 1,4-dimethanol dimethacrylate
bisphenol A bis(2-hydroxypropyl) methacrylate)

Other polyvinyl monomers (as listed in the Bordon Chemical Company Catalog, Philadelphia, Pa.) of interest are:

N,N-diallylacrylamide
triallyl aconitate
N-allyl methacrylamide
hexamethylene-1,6-bisacrylamide
divinyl benzene
1,1,1-trimethylolethane trimethacrylate
vinyl crotonate
vinyl methacrylate
divinyl diethylene glycol diether
allyl vinyl ether The novel mercaptans may, of course, also be employed in the polymerization of perfluoroalkyl group containing monomers. Examples of such perfluorinated monomers are acrylates and methacrylates as disclosed in U.S. Pats. 2,628,958, 3,256,230, 2,938,513, 3,282,905, 3,252,932 and 3,304,278.

Other $R_f$-groups containing monomers are fumarates, maleates, itaconates and other $\alpha,\beta$-unsaturated di- and triesters as described in the copending applications FCR–26, Ser No. 199,793 filed Nov. 17, 1971, now abandoned and FCR–27, Ser. No. 199,794 filed Nov. 17, 1971, and the following applications assigned to the assignee of the present invention:

Ser. No. 720,370, filed Apr. 10, 1968, in the names of Eduard K. Kleiner and Martin Knell; Ser. No. 732,040, filed May 27, 1968, in the names of Eduard K. Kleiner, Martin Knell and Pier Luigi Pacini; Ser. No. 812,439, filed Apr. 1, 1969, in the name of Eduard K. Kleiner; Ser. No. 820,647, filed Apr. 30, 1969, in the name of Eduard K. Kleiner; and Ser. No. 833,706, filed June 16, 1969, in the names of Eduard K. Kleiner and Pier Luigi Pacini. The disclosure of these copending applications for this related subject matter is incorporated by reference herein. Also included are $R_f$-groups containing vinyl ethers and vinyl esters as disclosed in U.S. 2,732,370, 2,828,025, 2,592,069, and 2,436,144.

Such $R_f$-groups containing monomers yield, of course, polymers already having low free surface energies and soil repellent properties. However, the use of the novel $R_f$-group containing mercaptans instead of conventional alkyl mercaptans such as dodecyl mercaptan contributes to increased repellency ratings and to decreased free surface energies.

Polymerization of the monomers may be carried out in bulk, solution, or emulsion. The preferred polymerization techniques are emulsion polymerization in an aqueous medium and solution polymerization.

In emulsion polymerization, the monomer or monomers to be polymerized are emulsified together in a water solution of a surface active agent to a given monomer concentration of from about 5% to about 50%. Usually the temperature is raised to between 40° C. and 70° C. to effect polymerization in the presence of an added catalyst. A suitable catalyst may be any one of the commonly known water soluble agents for initiating the polymerization of an ethylenically unsaturated compound. The concentration of the catalyst for the polymerization is usually between 0.1% and 2% based upon the weight of the monomers.

Suitable surfactants or emulsifying agents include cationic, anionic or non-ionic types. Since the cationic and non-ionic types can be used in most textile treating baths, they are preferred. The hydrophobic portion of the surfactant may be hydrocarbon or fluorinated hydrocarbon.

Suitable surfactants that may be used include, for example, non-ionic surfactants in which the hydrophilic group is a poly (ethoxy) group and the hydrophobic portion is a poly (propoxy) group or a fluorocarbon group such as the ethylene oxide condensates of alkyl phenols, alkanols, alkylamines, alkylthiols, alkylcarboxylic acids, fluoroalkyl carboxylic acids, fluoroalkyl amides and the like.

Suitable cationic surfactants include for example quaternary ammonium salts or amine salts containing at least one long chain alkyl, fluoroalkyl, or high alkyl substituted benzene or naphthalene group to provide the hydrophobic portion.

Polymerization is preferably carried out for a reaction period adjusted to obtain essentially quantitative conversion of the monomers. The optimum reaction time will depend upon the catalyst used and the polymerization temperature and other conditions, but will generally be in the range of from 0.5 to 24 hours.

The polymerization temperature will depend upon the catalyst chosen. In the case of emulsion polymerization in aqueous media, it will generally be in the range of from 40° to 90° C. The polymerization is generally most conveniently and preferably carried out at atmospheric pressure wherever possible.

In solution polymerization, the monomer or monomers are dissolved in a suitable solvent including aliphatic or aromatic hydrocarbons such as heptane, benzene, toluene, etc.; chlorinated or fluorinated aliphatic or aromatic hydrocarbons such as methylene chloride, chloroform, methyl chloroform, carbon tetrachloride, trichloroethylene, perchloroethylene, Freon's such as 1,1,2-trifluoro-1,2,2-trichloroethane, etc., chlorobenzene, benzotrifluoride or hexafluoroxylene, ketones, esters and ethers such as acetone, methyl isobutyl ketone, ethyl acetate and higher homologs, dialkyl ethers, tetrahydrofuran, ethylene glycol monomethyl or monoethyl ether, ethylene glycol dimethyl or diethyl ether, and mixtures of these ketones, esters or ethers with water. Thereafter polymerization proceeds in a reaction vessel using initiators such as azobisisobutyronitrile or benzoyl peroxide at concentrations of 0.1 to 2.0% at 40–100° C. under nitrogen.

It is often an advantage in the case of emulsion polymerization to post-emulsify the mercaptans of types I and II prior to the polymerization reaction with emulsifiers as listed above.

The composition of the novel polymers may vary considerably. On a weight percent ratio, the novel $R_f$-mercaptans may contribute from .1 to 95% to the total weight of the novel polymers. A more suitable percentage of moiety introduced by chain transfer is 2 to 70%. If an attempt is made to reduce the free surface energy of a polymer just slightly, very small amounts of the mercaptans of types I and II are employed; if, on the other hand, a highly oil repellent polymer has to be obtained, larger amounts of the mercaptans are employed as shown in the following examples.

The novel polymers of types III and IV have any potential applications. They can be applied to substrates such as textiles, paper, leather, wood, metallic surfaces and the like providing oil and water repellency to the treated substrates at extremely low adds-ons. As shown in the examples, good repellency ratings are obtained with as little fluorine as 0.04 to 0.12% on weight of the substrate. Besides oil and water repellency, the adducts show excellent fastness properties such as wash and dryclean fastness, abrasion resistance and good drysoiling and soil release properties. The novel polymers may be applied to the various substrates by various coating techniques, such as dipping, spraying, brushing, padding, roll coating, and the like.

The polymers prepared employing the novel mercaptans were characterized in many ways:

Elemental analysis (fluorine content) of polymers purified via precipitation proves that the new mercaptans have become an integral part of the novel polymers.

Molecular weight determination indicate clearly that the novel mercaptans act as chain transfer agents: i.e., molecular weights obtained decrease with increasing amounts of $R_f$-mercaptan employed during the polymerization.

The determination of the critical surface tension ($\gamma_c$) in dynes per centimeter shows that the free suface energy of a polymer or copolymer is lowered if the novel $R_f$-mercaptans are built into the polymer chain.

The critical surface tensions ($\gamma_c$) were determined by contact angle measurements of nonpolar liquids on films of the novel polymers the following way:

The polymers were dissolved in spectrograde acetone at 2% by weight. Films were made by placing a few drops of the polymer solutions on a glass slide and with a clean edge spreading the solution over the surface of the slide. Instantaneous solvent evaporation left the polymer as a smooth film. Contact angles of octane to tetradecane on the polymer films were measured using a Visco-Tech contact angle analyzer. From the contact ankle data, $\gamma_c$ was determined according to the following reference: W. Zisman, Contact Angles, Advances in Chemistry, No. 43, ACS Publications, Washington, D.C., 1964.

The usefulness of the polymers containing built-in $R_f$-mercaptans is, however, best shown by measuring the oil and water repellency ratings of substrates such as fabrics, paper, leather, etc. which were treated with solutions or emulsions of the novel polymers:

The AATCC water spray test rating was determined according to Standard Test method 22–1966 of the American Association of Textile Chemists and Colorists, XXXVII, 1961, 1952 (also designated ASTM-D-583-58). Ratings are given from 0 (minimum) to 100 (maximum).

The AATCC Oil Rating was determined according to Standard Test method 118–1966T of the American Association of Textile Chemists and Colorists. Ratings are given from 0 (minimum) to 8 (maximum). A commonly accepted level on soil repellent fabrics in the U.S. is an oil repellency of 4.

The novel polymers also show considerable fastness properties such as washfastness. They show excellent soil release properties especially if hydrophilic monomer moieties such as acrylic acid, methacrylic acid, vinyl pyrrolidone, polyethylene glycol dimethacrylate etc. are present in the novel polymers.

The soil release properties were determined according to AATCC Standard Test Method 130–1969. Ratings are given from 1 (minimum) to 5 (maximum).

The home washes were carried out in a Kenmore washing machine, Model 600, at 120° F., employing 45 g. of the detergent "Tide XK" per washload.

All mentioned AATCC Tests are listed in the Technical Manual of the American Association of Textile Chemists and Colorists, volume 46, edition 1970.

The novel polymers weer applied to cotton fabric or polyester-cotton twill (65/35) in such a way that 0.04, 0.08 and 0.12% fluorine were deposited onto the fabric.

Polymers dissolved in a non-aqueous medium were mostly applied to cotton by a padding process and were evaluated after air drying and after curing in a hot air oven at 150° C. for 3 minutes.

Polymers prepared in water or a water-solvent mixture or a solvent which is water-miscible were applied to polyester-cotton twill by padding from an aqueous pad bath containing also the following permanent press resin catalyst and additives (so-called standard permanent press recipe):

4 grams/liter acetic acid (50%)
20 grams/liter isopropanol
240 grams/liter dimethylol dihydroxyethylene urea
40 grams/liter zinc nitrate catalyst
0.16% F/liter fluorochemical
pH adjusted to 4.5 with acetic acid—wet pick-up 50%

After the padding, the fabric is dried at 100° C. for 2 minutes and cured at 163° C. for 5 minutes.

The following examples and tables exemplify suitable starting perfluoroalkyl mercaptans and the polymers obtained with these mercaptans. As previously discussed the mercaptans act as chain transfer agents and are built into the polymer chain. Also data is provided which demonstrates the oil-water repellency and soil release prooperties of the polymers.

TABLE 1

| $R_f$-mercaptans, example | Reference number FCR-10 | Structure of $R_f$-mercaptans |
|---|---|---|
| A | Example 7 | $HS-CHCO_2CH_2CH_2C_8F_{17}$<br>$\quad\quad\mid$<br>$\quad\quad CH_2CO_2CH_2CH_2C_8F_{17}$ |
| B | Example 15 | $[HSCH_2CH_2COOCH_2]_{2av}-C-[CH_2OOCCH_2CH_2SCHCOOCH_2CH_2C_8F_{17}]_{2av}$<br>$\quad\quad\quad\quad\quad\quad\quad\quad\quad\quad\quad\quad\quad\quad\quad\quad\quad\quad\quad\quad\quad\quad\quad\quad\quad\quad\mid$<br>$\quad\quad\quad\quad\quad\quad\quad\quad\quad\quad\quad\quad\quad\quad\quad\quad\quad\quad\quad\quad\quad\quad CH_2COOCH_2CH_2C_8F_{17}$ |
| C, D, E, F | Ex. 17, 18, 19 plus analog. | $[HSCH_2CH_2COOCH_2]_n-C-[CH_2OOCCH_2CH_2SCHCOOCH_2CH_2R_f]_m$<br>$\quad\quad\quad\quad\quad\quad\quad\quad\quad\quad\quad\quad\quad\quad\quad\quad\quad\quad\quad\quad\mid$<br>$\quad\quad\quad\quad\quad\quad\quad\quad\quad\quad\quad\quad\quad\quad\quad\quad\quad\quad\quad CH_2COOCH_2CH_2R_f$ |

$R_f = -C_6F_{13}, -C_8F_{17}, -C_{10}F_{21}$ in ratios as shown in FCR-10, Ex. C and Table 2-b.

Example  C: m=2.5, n=1.5
        D: m=3.0, n=1.0  } average
        E: m=2.0, n=2.0
        F: m=1.0, n=3.0

| G, H, I | Ex. 23 plus analog. | $[HSCH_2CH_2COOCH_2]_n-[CCH_2OCH_2C]-[CH_2OOCCH_2CH_2SCHCOOCH_2CH_2R_f]_m$<br>$\quad\quad\quad\quad\quad\quad\quad\quad\quad\quad\quad\quad\quad\quad\quad\quad\quad\quad\quad\quad\quad\quad\quad\quad\quad\quad\quad\mid$<br>$\quad\quad\quad\quad\quad\quad\quad\quad\quad\quad\quad\quad\quad\quad\quad\quad\quad\quad\quad\quad\quad\quad\quad\quad CH_2COOCH_2CH_2R_f$ |

$R_f$ = as in Examples C to F.

Example  G:    m=3.0,  n=3.0
        H:    m=3.5,  n=2.5   } average
        I(a): m=3.75, n=2.25
        I(b): m=4,    n=2

| J | Example 35 | $[HSCH_2CH_2COOCH_2]_{4av}-[CCH_2OCH_2CCH_2OCH_2C]-[CH_2OOCCH_2CH_2SCHCOOCH_2CH_2R_f]_{4av}$<br>$\quad\quad\quad\quad\quad\quad\quad\quad\quad\quad\quad\quad\quad\quad\quad\quad\quad\quad\quad\quad\quad\quad\quad\quad\quad\quad\quad\quad\quad\quad\quad\quad\mid$<br>$\quad\quad\quad\quad\quad\quad\quad\quad\quad\quad\quad\quad\quad\quad\quad\quad\quad\quad\quad\quad\quad\quad\quad\quad\quad\quad\quad\quad\quad CH_2COOCH_2CH_2R_f$ |

$R_f$ = as in Examples C to F.

| K | Example 24 | $[HSCH_2CH_2COOCH_2]_2-C-[CH_2OOCCH_2CH_2SCHCOSCH_2CH_2C_7F_{15}]_2$<br>$\quad\quad\quad\quad\quad\quad\quad\quad\quad\quad\quad\quad\quad\quad\quad\quad\quad\quad\quad\quad\mid$<br>$\quad\quad\quad\quad\quad\quad\quad\quad\quad\quad\quad\quad\quad\quad\quad\quad\quad\quad\quad CH_2COSCH_2CH_2C_7F_{15}$ |
| L | Example 25 | $[HSCH_2CH_2COOCH_2]_2-C-[CH_2OOCCH_2CH_2SCHCOOCH_2CH=CHC_7F_{15}]_2$<br>$\quad\quad\quad\quad\quad\quad\quad\quad\quad\quad\quad\quad\quad\quad\quad\quad\quad\quad\quad\quad\mid$<br>$\quad\quad\quad\quad\quad\quad\quad\quad\quad\quad\quad\quad\quad\quad\quad\quad\quad\quad\quad CH_2COOCH_2CH_2CH=CHC_7F_{15}$ |
| M | Example 26 | $[HSCH_2CH_2COOCH_2]_2-C-[CH_2OOCCH_2CH_2SCHCOO(CH_2)_9CH=CHC_7F_{15}]_2$<br>$\quad\quad\quad\quad\quad\quad\quad\quad\quad\quad\quad\quad\quad\quad\quad\quad\quad\quad\quad\quad\mid$<br>$\quad\quad\quad\quad\quad\quad\quad\quad\quad\quad\quad\quad\quad\quad\quad\quad\quad\quad\quad CH_2COO(CH_2)_9CH=CHC_7F_{15}$ |
| N | Example 27 | $[HSCH_2CH_2COOCH_2]_2-C-[CH_2OOCCH_2CH_2SCHCOOCH_2CH_2CF_2CF_2OCF(CF_3)_2]_2$<br>$\quad\quad\quad\quad\quad\quad\quad\quad\quad\quad\quad\quad\quad\quad\quad\quad\quad\quad\quad\quad\mid$<br>$\quad\quad\quad\quad\quad\quad\quad\quad\quad\quad\quad\quad\quad\quad\quad\quad\quad\quad\quad CH_2COOCH_2CH_2CF_2CF_2OCF(CF_3)_2$ |
| O | Example 28 | $[HSCH_2CH_2COOCH_2]_2-C-[CH_2OOCCH_2CH_2SCHCOOCH_2CH_2NHCOC_7F_{15}]_2$<br>$\quad\quad\quad\quad\quad\quad\quad\quad\quad\quad\quad\quad\quad\quad\quad\quad\quad\quad\quad\quad\mid$<br>$\quad\quad\quad\quad\quad\quad\quad\quad\quad\quad\quad\quad\quad\quad\quad\quad\quad\quad\quad CH_2COOCH_2CH_2NHCOC_7F_{15}$ |
| P | Example 29 | $[HSCH_2CH_2COOCH_2]_2-C-[CH_2OOCCH_2CH_2SCHCOSCH_2CH_2NHCOC_7F_{15}]_2$<br>$\quad\quad\quad\quad\quad\quad\quad\quad\quad\quad\quad\quad\quad\quad\quad\quad\quad\quad\quad\quad\mid$<br>$\quad\quad\quad\quad\quad\quad\quad\quad\quad\quad\quad\quad\quad\quad\quad\quad\quad\quad\quad CH_2COSCH_2CH_2NHCOC_7F_{15}$ |
| Q | Example 30 | $[HSCH_2CH_2COOCH_2]_2-C-[CH_2OOCCH_2CH_2SCHCOOCH_2CH_2N(C_2H_5)SO_2C_8F_{17}]_2$<br>$\quad\quad\quad\quad\quad\quad\quad\quad\quad\quad\quad\quad\quad\quad\quad\quad\quad\quad\quad\quad\mid$<br>$\quad\quad\quad\quad\quad\quad\quad\quad\quad\quad\quad\quad\quad\quad\quad\quad\quad\quad\quad CH_2COOCH_2CH_2N(C_2H_5)SO_2C_8F_{17}$ |
| R | Example 31 | $[HSCH_2CH_2COOCH_2]_2-C-[CH_2OOCCH_2CH_2SCH_2CHCOOCH_2C_7F_{15}]_2$<br>$\quad\quad\quad\quad\quad\quad\quad\quad\quad\quad\quad\quad\quad\quad\quad\quad\quad\quad\quad\quad\mid$<br>$\quad\quad\quad\quad\quad\quad\quad\quad\quad\quad\quad\quad\quad\quad\quad\quad\quad\quad\quad CH_2COOCH_2C_7F_{15}$ |
| S | Example 32 | $[HSCH_2CH_2COOCH_2]_2-C-[CH_2OOCCH_2CH_2SCH_2CHCOOCH_2CH_2OCH_2CH=CHC_7F_{15}]_2$<br>$\quad\quad\quad\quad\quad\quad\quad\quad\quad\quad\quad\quad\quad\quad\quad\quad\quad\quad\quad\quad\mid$<br>$\quad\quad\quad\quad\quad\quad\quad\quad\quad\quad\quad\quad\quad\quad\quad\quad\quad\quad\quad CH_2COOCH_2CH_2OCH_2CH=CHC_7F_{15}$ |
| T | Example 33 | $[HSCH_2CH_2COOCH_2]_2-C-[CH_2OOCCH_2CH_2SCH_2CHCOOCH_2CH_2N(C_2H_5)SO_2C_8F_{17}]_2$<br>$\quad\quad\quad\quad\quad\quad\quad\quad\quad\quad\quad\quad\quad\quad\quad\quad\quad\quad\quad\quad\mid$<br>$\quad\quad\quad\quad\quad\quad\quad\quad\quad\quad\quad\quad\quad\quad\quad\quad\quad\quad\quad CH_2COOCH_2CH_2N(C_2H_5)SO_2C_8F_{17}$ |
| U | Example 34 | $[HSCH_2CH_2COOCH_2]_2-C-[CH_2OOCCH_2CH_2SCH_2CHCONCH_2C_7F_{15}]_2$<br>$\quad\quad\quad\quad\quad\quad\quad\quad\quad\quad\quad\quad\quad\quad\quad\quad\quad\quad\quad\quad\mid$<br>$\quad\quad\quad\quad\quad\quad\quad\quad\quad\quad\quad\quad\quad\quad\quad\quad\quad\quad\quad CH_2CONCH_2C_7F_{15}$ |

EXAMPLES 1–13

Ten parts of a mixture of mercaptans A or B or 1,1,2,2-tetrahydroperfluorodecyl mercaptan and methyl methacrylate in ratios as indicated in Table 2, 0.5% of azobisisobutyronitrile based on the weight of methyl methacrylate and 20 parts of ethyl acetate were sealed in an ampule under nitrogen and polymerized for 16 hours at 70° C. in a constant temperature oil bath. The resulting polymer solutions were diluted with 20 parts of acetone and added dropwise into 800 parts of a non-solvent as shown in Table 2 under vigorous stirring. In each case, the polymethyl methacrylate precipitated as a fine, white powder and was separated by filtration from the solvent-nonsolvent mixture. After drying the polymer powder under high vacuum, the yield, fluorine content, molecular weight and free surface energy of the novel polymers was determined and results were obtained, as shown in Table 2. The listed yields indicate that at higher mercaptan levels more low-molecular weight of polymethyl methacrylate is formed which does not precipitate in the employed solvent-nonsolvent mixture. The yields, molecular weight determinations and fluorine analysis indicate further that the novel mercaptans act as chain transfer agents and are built into the polymer chain. The critical surface tension data ($\gamma_c$) in Table 2 show that at fluorine levels above about 1% fluorine, $\gamma_c$ changes very little for a given type of $R_f$-mercaptan. A comparison of the average $\gamma_c$-values obtained shows that the $\gamma_c$ of pure polymethylate is reduced from 39 to 22 dynes/cm. with $HSCH_2CH_2C_8F_{17}$ 39 to 14 dynes/cm. with

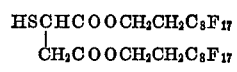

and from 39 to 12 dynes/cm. with

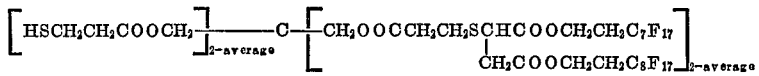

These results show clearly that the novel $R_f$-mercaptans reduce the critical surface tensions significantly more than a $R_f$-mercaptan containing just one $R_f$-group.

TABLE 2

| Example number | Mercaptan | $R_f$-mercaptan-monomer composition, percent by weight — Methyl methacrylate | Polymer yield after precipitation, percent by weight | Fluorine in polymer — Calc. | Fluorine in polymer — Found | Polymer molecular weight $M_N$ (VPO) | Critical surface tension, $\gamma_c$ dynes/cm. | Non-solvent used for precipitation |
|---|---|---|---|---|---|---|---|---|
| 1 | None | 100 | 96.5 | None | | 23,600 | 39.0 | Hexane. |
| 2 | Example A,[1] 2 | 98 | 95.2 | 1.24 | 0.85 | 6,815 | 14.3 | Do. |
| 3 | Example A, 5 | 95 | 95.5 | 3.1 | 2.43 | 6,077 | 13.8 | Do. |
| 4 | Example A, 10 | 90 | 96.4 | 6.2 | 4.8 | 4,452 | 14.7 | Do. |
| 5 | Example A, 20 | 80 | 88.7 | 12.4 | 11.9 | 2,832 | 13.2 | Do. |
| 6 | Example B,[2] 2 | 98 | 86.0 | 1.06 | 0.52 | 16,334 | 12.0 | Methanol. |
| 7 | Example B, 5 | 95 | 85.0 | 2.65 | 2.27 | 15,854 | 12.2 | Do. |
| 8 | Example B, 10 | 90 | 83.0 | 5.3 | 5.23 | 13,560 | 11.7 | Do. |
| 9 | Example B, 20 | 80 | 80.0 | 10.6 | 11.78 | 11,318 | 11.5 | Do. |
| 10 | See 3, 2 | 98 | 93.2 | 1.34 | 0.68 | 9,825 | 22.4 | Hexane. |
| 11 | See 3, 5 | 95 | 84.8 | 3.37 | 2.02 | 7,810 | 22.6 | Do. |
| 12 | See 3, 10 | 90 | 82.5 | 6.7 | 5.42 | 4,518 | 21.7 | Do. |
| 13 | See 3, 20 | 80 | 56.2 | 13.5 | 8.20 | 3,119 | 21.1 | Do. |

[1] 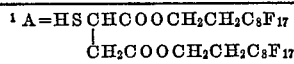

[2] 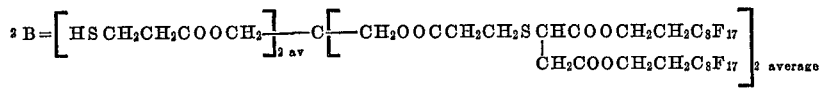

[3] 

EXAMPLES 14–21

Methyl methacrylate was polymerized in the presence of variable amounts of the mercaptan C as shown in Table 3 employing the polymerization and workup procedure described for Examples 1 to 13. The results in Table 3 prove again as the results did in Table 2 that polymethyl methacrylates with lower critical surface tensions were obtained. Again as shown in the previous examples 1 to 13, a $\gamma_c$-minimum is obtained with as little as 1% fluorine in polymethyl methacrylate (approximately 12.5 dynes/cm. average), whereas with 0.25, 0.5 and 1% $R_f$-mercaptan (=0.15, 0.33 and 0.55% fluorine) the $\gamma_c$-value of polymethyl methacrylate is reduced from 39 to 25.3, 23.0 and 19.7 dynes/cm.

TABLE 3

| Example number | Mercaptan | $R_f$-mercaptan-monomer composition, percent by weight — Methyl methacrylate | Polymer yield after precipitation, percent by weight | Fluorine in polymer — Calc. | Fluorine in polymer — Found | Polymer mol. weight $M_N$ (VPO) | Critical surface tension $\gamma_c$ dynes/cm. | Non-solvent used for precipitation |
|---|---|---|---|---|---|---|---|---|
| 14 | Example C,[1] 0.25 | 99.75 | 85.3 | 0.13 | 0.15 | 29,521 | 25.3 | Methanol. |
| 15 | Example C, 0.5 | 99.5 | 84.7 | 0.25 | 0.33 | 25,875 | 23.0 | Do. |
| 16 | Example C, 1 | 99 | 85.0 | 0.50 | 0.55 | 22,920 | 19.7 | Do. |
| 17 | Example C, 2 | 98 | 84.5 | 1.0 | 0.74 | 21,809 | 12.5 | Do. |
| 18 | Example C, 5 | 95 | 81.4 | 2.6 | 1.83 | 10,017 | 12.5 | Do. |
| 19 | Example C, 10 | 90 | 76.8 | 5.1 | 4.89 | 7,660 | 12.9 | Do. |
| 20 | Example C, 20 | 80 | 66.0 | 10.2 | 10.36 | 6,361 | 14.8 | Do. |
| 21 | Example C, 30 | 70 | 62.0 | 15.4 | 17.98 | 4,556 | 13.2 | Do. |

[1] 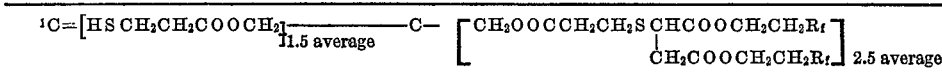

EXAMPLES 22–27

10 parts of a mixture of adduct Example C and monomers as shown in Table 4, 0.5 parts of azobisisobutyronitrile and 20 parts of methyl chloroform were sealed in an ampul under nitrogen and kept in a water bath shaker at 70° C. for 16 hours after which time the solutions became very viscous and a solid content determination and IR analysis indicated that polymerization was complete. The polymer solutions were then diluted with an acetone methyl chloroform mixture (1:9) to a solution with 2% solid content and applied to cotton as described so that 0.04, 0.08 and 0.12% fluorine was deposited on the fabric. Repellency data obtained, including fluorine content of the polymers of Examples 22 to 27 are summarized in Table 4.

peroxide and 20 parts of ethyl acetate in an ampul and polymerizing the eleven mixtures at 80° for 16 hours. The viscous polymer solutions obtained were diluted to a 10% solution with ethyl acetate and the polymethyl methacrylates precipitated as fine, white powders by adding the ethyl acetate solution under vigorous stirring to 20 times the amount of methanol. A comparison of the molecular weights of the eleven polymethyl methacrylate

TABLE 4

| Example number | $R_f$-mercaptan monomer composition, percent by wt. | | | F-content in polymer | Curing conditions | AATCC oil repellency, percent F | | | AATCC water repellency, percent F | | |
|---|---|---|---|---|---|---|---|---|---|---|---|
| | $R_f$-mercaptan, example | Monomer 1 | Monomer 2 | | | 0.04 | 0.08 | 0.12 | 0.04 | 0.08 | 0.12 |
| 22 | C, 50 | Methyl methacrylate, 50 | None | 26.65 | Air dried, 3 min., 150° C. | 4 / 3 | 6 / 6 | 7 / 6 | 50 / 50 | 70 / 70 | 70 / 80 |
| 23 | C, 40 | Methyl methacrylate, 60 | do | 21.5 | do | 4 / 3 | 6 / 6 | 7 / 6 | 50 / 50 | 70 / 70 | 70 / 80 |
| 24 | C, 30 | Methyl methacrylate, 70 | do | 16.0 | do | 4 / 3 | 6 / 5 | 6 / 6 | 50 / 50 | 50 / 70 | 70 / 80 |
| 25 | C, 50 | Methyl methacrylate, 49 | HEMA,[1] 1 | 26.65 | do | 4 / 4 | 6 / 6 | 7 / 6 | 50 / 70 | 70 / 70 | 70 / 80 |
| 26 | C, 40 | Methyl methacrylate, 58.8 | HEMA,[1] 1.2 | 21.5 | do | 4 / 3 | 6 / 6 | 7 / 6 | 50 / 50 | 70 / 70 | 70 / 80 |
| 27 | C, 30 | Methyl methacrylate, 68.6 | HEMA,[1] 1.4 | 16.0 | do | 4 / 3 | 6 / 5 | 7 / 6 | 50 / 50 | 70 / 70 | 80 / 80 |

[1] HEMA = 2-hydroxyethyl methacrylate.

EXAMPLES 28–33

Mixtures of adducts C, D, E and F and monomers as shown in Table 5 were polymerized and the resulting polymer solutions diluted and applied to cotton as described in the preceding Exampless 22–27. Data obtained are summarized in Table 5.

EXAMPLES 34–38

Mixtures of adduct I and methyl methacrylate in ratios as shown in Table 6 were polymerized and the resulting polymer solutions diluted and applied to cotton as described in the preceding Examples 22–27. Repellency data obtained are summarized in Table 6.

samples, ranging from 9,000 to 14,000 with polymethyl methacrylate prepared accordingly in the absence of a mercaptan (Example 1) indicates clearly that all of the mercaptans K through U act as chain transfer agents during the free radical polymerization of methyl methacrylate.

EXAMPLES 50–53

Two parts of the $R_f$-mercaptan Example E, 2 parts of monomer, 0.04 part of azobisisobutyronitrile and 12 parts of solvent as shown in Table 7 were sealed in an ampul under nitrogen and polymerized at 60° C. for 16 hours. The polymer solutions were precipitated into 20 times the amount of a non-solvent (see Table 7) and the

TABLE 5

| Example number | $R_f$-mercaptan monomer composition, percent by wt. | | | F-content in polymer | Curing conditions | AATCC oil repellency, percent F | | | AATCC water repellency, percent F | | |
|---|---|---|---|---|---|---|---|---|---|---|---|
| | $R_f$-mercaptan, example | Monomer 1 | Monomer 2 | | | 0.04 | 0.08 | 0.12 | 0.04 | 0.08 | 0.12 |
| 28 | C, 40 | Methyl methacrylate, 60 | None | 21.5 | Air dried, 3 min., 150° C. | 4 / 3 | 6 / 6 | 7 / 6 | 50 / 50 | 70 / 70 | 70 / 80 |
| 29 | C, 40 | Styrene, 60 | do | 21.5 | do | 2 / 1 | 5 / 4 | 5-6 / 5 | 0 / 0 | 60 / 50 | 70 / 50 |
| 30 | C, 40 | Styrene,[1] 31 | Maleic[1] anhydride, 29. | 21.5 | do | 2 / 1 | 4 / 3-4 | 5 / 5 | 0 / 70 | 80 / 80 | 90 / 80 |
| 31 | D, 40 | Methyl methacrylate, 60 | None | 22.1 | do | 2 / 2 | 5-6 / 4-5 | 6 / 5 | 50 / 50 | 70 / 70 | 70 / 70 |
| 32 | E, 40 | do | do | 20.6 | do | 2 / 1-2 | 5 / 4 | 5-6 / 5 | 0 / 0 | 50 / 50 | 70 / 70 |
| 33 | F, 40 | do | do | 17.3 | do | 0-1 / 0-1 | 3-4 / 3-4 | 4-5 / 4-5 | 0 / 0 | 50 / 50 | 50 / 50 |

[1] Molar ratio of styrene to maleic anhydride = 1:1.

TABLE 6

| Example number | $R_f$-mercaptan monomer composition percent by wt. | | F-content in polymer | Curing conditions | AATCC oil repellency, percent F | | | AATCC water repellency, 0.08 percent F |
|---|---|---|---|---|---|---|---|---|
| | $R_f$-mercaptans, example | Monomer | | | 0.04 | 0.08 | 0.12 | |
| 34 | I, 30 | Methyl methacrylate, 70 | 15.0 | Air dried, 3 min., 150° C. | 2 / 3 | 5 / 5 | 6 / 5-6 | 70 / 80 |
| 35 | I, 40 | Methyl methacrylate, 60 | 21.1 | do | 2-3 / 2 | 5 / 5 | 6 / 5 | 70 / 70 |
| 36 | I, 50 | Methyl methacrylate, 50 | 26.4 | do | 2 / 3 | 5 / 5 | 6 / 5 | 70 / 80 |
| 37 | I, 60 | Methyl methacrylate, 40 | 31.6 | do | 2-3 / 3 | 5-6 / 5 | 6 / 6 | 80 / 80 |
| 38 | I, 70 | Methyl methacrylate, 30 | 36.8 | do | 2-3 / 2-3 | 5 / 5 | 6 / 6 | 70 / 80 |

EXAMPLES 39–49

Eleven polymethyl methacrylate samples were prepared by sealing under nitrogen two parts of adducts K through U, 8 parts of methyl methacrylate, 0.05 part of benzoyl precipitated polymers filtered and dried. The polymers were obtained as white powders in yields ranging from 84 to 87%. The elemental analysis of the polymers proves that the $R_f$-mercaptan was incorporated into the polymer chain. The fluorine numbers obtained show that the percentage of fluorine in the precipitated polymers is lower than in the low-molecular weight polymer portion which did not precipitate with the solvent-nonsolvent system employed.

EXAMPLES 54–57

Three parts of $R_f$-mercaptan E and 7 parts of monomer as listed in Table 8; 0.05 part of azobisisobutyronitrile and 20 parts of ethyl acetate were sealed in an ampul under nitrogen and polymerized at 70° C. for 16 hours. The resulting polymer solutions were diluted to 10% solutions with acetone and precipitated in 20 times the amount of a nonsolvent (Table 8). The precipitated polymers were filtered, dried and yield, fluorine content and molecular weight determined as shown in Table 8.

Oil and water repellency results obtained are listed in Table 9.

EXAMPLES 64–69

The Examples 58 to 63 were repeated but instead of the $R_f$-mercaptan C, the $R_f$-mercaptan I(b) was employed as chain transfer agent. Oil and water repellency ratings obtained with these polymers are summarized in Table 10.

TABLE 9

| Example number | Rf-mercaptan monomer composition; percent by wt. | | | F-content in polymer F-content | Curing conditions | AATCC oil repellency, percent F | | | AATCC water repellency, percent F | | |
|---|---|---|---|---|---|---|---|---|---|---|---|
| | Rf-mercaptan, Example C | Methyl methacrylate | Methacrylic acid | | | 0.04 | 0.08 | 0.12 | 0.04 | 0.08 | 0.12 |
| 58 | 40 | 50 | 10 | 20.8 | Air dried, 3 min., 150° C | 3.5 / 2 | 5.5 / 5.5 | 6 / 5 | 60 / 60 | 60 / 60 | 70 / 70 |
| 59 | 40 | 40 | 20 | 20.8 | do | 2 / 1 | 5 / 4 | 5.5 / 5 | 60 / 50 | 60 / 60 | 70 / 60 |
| 60 | 40 | 30 | 30 | 20.8 | do | 2.5 / 1 | 5 / 4 | 6 / 5 | 60 / 50 | 60 / 60 | 60 / 60 |
| 61 | 40 | 20 | 40 | 20.8 | do | 3 / 2 | 5 / 4 | 6 / 5 | 50 / 50 | 60 / 60 | 60 / 60 |
| 62 | 40 | 10 | 50 | 20.8 | do | 2.5 / 1.5 | 5 / 5 | 6 / 5 | 0 / 50 | 50 / 60 | 60 / 60 |
| 63 | 40 | 0 | 60 | 20.8 | do | 2.5 / 2 | 5 / 4.5 | 5.5 / 5 | 0 / 50 | 0 / 50 | 50 / 60 |

TABLE 10

| Example number | Rf-mercaptan monomer composition; percent by wt. | | | F-content in polymer | Curing conditions | AATCC oil repellency, percent F | | | AATCC water repellency, percent F | | |
|---|---|---|---|---|---|---|---|---|---|---|---|
| | Rf-mercaptan, Example C | Methyl methacrylate | Methacrylic acid | | | 0.04 | 0.08 | 0.12 | 0.04 | 0.08 | 0.12 |
| 64 | 40 | 50 | 10 | 20.8 | Air dried, 3 min., 150° C | — / 2 | 2 / 2 | 4.0 / 4.5 | 50 / 50 | 50 / 60 | 50 / 50 |
| 65 | 40 | 40 | 20 | 20.8 | do | 0.5 / 0.5 | 2 / 2 | 4.5 / 3.5 | 50 / 50 | 60 / 50 | 60 / 50 |
| 66 | 40 | 30 | 30 | 20.8 | do | 0.5 / 0.5 | 2 / 2.5 | 3.5 / 3 | 0 / 50 | 50 / 50 | 50 / 50 |
| 67 | 40 | 20 | 40 | 20.8 | do | 0.5 / 0.5 | 2 / 2 | 4 / 3 | 0 / 0 | 50 / 50 | 50 / 50 |
| 68 | 40 | 10 | 50 | 20.8 | do | 2.5 / 0.5 | 2.5 / 2 | 4 / 3 | 0 / 50 | 50 / 50 | 50 / 50 |
| 69 | 40 | 0 | 60 | 20.8 | do | 0.5 / 0.5 | 2 / 1.5 | 4 / 3 | 0 / 0 | 0 / 0 | 50 / 50 |

EXAMPLES 70–73

Ten parts of a mixture of N-vinylpyrrolidone and mercaptan E in ratios as shown in Table 11, azobisisobutyronitrile 0.1 part and thirty parts of a mixture of acetone-water (1:3) were sealed in a glass reactor under nitrogen and polymerized in a water bath shaker for 10 hours at 60° C. After this time, UV-analysis of the reaction mix-

TABLE 7

| Example number | Rf-mercaptan (parts) | Monomer (parts) | Molar ratio Rf-mercaptan to monomer | Solvent (nonsolvent) | Elemental analysis | | | | | |
|---|---|---|---|---|---|---|---|---|---|---|
| | | | | | Calculated | | | Found | | |
| | | | | | C | H | F | C | H | F |
| 50 | Example E (2) | Methacrylamide (2) | 1:28.2 | Ethyl acetate (acetone) | 42.92 | 5.15 | 25.95 | 43.94 | 5.20 | 20.72 |
| 51 | Example E (2) | 2-hydroxyethyl methacrylate (2) | 1:19.3 | Acetone (heptane) | 43.82 | 5.09 | 25.95 | 44.49 | 5.66 | 17.99 |
| 52 | Example E (2) | Acrylamide (2) | 1:35 | Water (methanol) | 40.67 | 4.49 | 25.95 | 39.48 | 3.49 | 21.21 |

TABLE 8

| Example number | Rf-mercaptan (parts) | Monomer (parts) | Nonsolvent for p.p.t. | Polymer yield after p.p.t., percent | Fluorine in polymer, percent | | Mol. weight, $M_N$ |
|---|---|---|---|---|---|---|---|
| | | | | | Calc. | Found | |
| 54 | Example E(3) | Vinyl acetate (7) | Hexane | 63.0 | 15.4 | 12.01 | 3,696 |
| 55 | do | Acrylonitrile (7) | Benzene | 75.0 | 15.4 | 12.93 | 8,109 |
| 56 | do | Diethyl fumarate-methyl vinyl ether [1] (7) | Heptane | 73.0 | 15.4 | 17.2 | 3,100 |
| 57 | do | Styrene-maleic anhydride [1] (7) | Methanol | 85.5 | 15.4 | 13.42 | 4,025 |

[1] Molar ratio=1:1.

EXAMPLES 58–63

Ten parts of a mixture of methyl methacrylate, methacrylic acid and $R_f$-mercaptan C in ratios as shown in Table 9, 0.05 part of azobisisobutyronitrile and 40 parts of methyl chloroform were sealed in an ampul under nitrogen and polymerized at 65° C. for 18 hours. The polymers formed precipitated during polymerization as white, brittle powders and were filtered and redissolved in a methyl Cellosolve-acetone mixture (1:1) and applied to a polyester-cotton fabric in such a way that 0.04, 0.08 and 0.12% fluorine was deposited onto the test fabric.

ture indicated that in all cases less than .5% unreacted, N-vinylpyrrolidone was present in the bluish polymer dispersion, which can be diluted with water without precipitation occurring. The polymer solutions were applied together with the described standard permanent press resin and catalysts to a polyester-cotton twill fabric so that a total of 0.12% fluorine was deposited onto the fabric. The oil repellency and soil release results obtained as shown in Table 11 indicate that the polymers impart not only high initial ratings but also due to the fastness of the finish, excellent ratings after five washes.

TABLE 11

| Example number | Mercaptan E, parts | N-vinyl-pyrroli-done, parts | AATCC oil repellency | | AATCC water repellency | | AATCC soil release | |
|---|---|---|---|---|---|---|---|---|
| | | | 1 wash | 5 washes | 1 wash | 5 washes | 1 wash | 5 washes |
| 70 | 3 | 7 | 4 | 2 | 50 | 50 | 4 | 3 |
| 71 | 4 | 6 | 6 | 2 | 50 | 50 | 4.5 | 3.5 |
| 72 | 5 | 5 | 6 | 3 | 50 | 50 | 4.5 | 3.5 |
| 73 | 6 | 4 | 6 | 4 | 50 | 50 | 4 | 3.5 |

EXAMPLES 74–78

The polymerizations of N-vinylpyrrolidone as shown in the previous Examples 70–73 were repeated, but mercaptan G and a reactive comonomer, N-methylolacrylamide in ratios as shown in Table 12 were employed instead. Again, translucent polymer dispersions were obtained which were dilutable with water and compatible with permanent press resins, catalysts and extender polymers due to the nonionic character of the polymer and the absence of any emulsifier. Oil repellency and soil release results obtained after 1 and 5 washes if coapplied with the standard permanent press resin to polyester-cotton twill (0.12% fluorine on weight of fabric) is shown in Table 12.

EXAMPLES 79–85

Ten parts of a mixture of mercaptan E, N-vinyl-pyrrolidone and a comonomer as listed in Table 13, 0.05 parts of azobisisobutyronitrile and 30 parts of a mixture of acetone-water (28:72) were sealed in an ampul under nitrogen and polymerized for 16 hours at 60° C. The polymer solutions or dispersions obtained were either clear blue or milky white and were dilutable with water. A solid content determination as shown in Table 13 indicates that conversion to the polymer was essentially quantitative in all cases. The polymer solutions were applied with the standard permanent press resin to polyester-cotton twill in such a way that 0.08% fluorine was deposited onto the fabric. Oil and soil release ratings obtained after one and five washes are also shown in Table 13.

$R_f$ is a perfluoroalkyl group of 2 to 18 carbon atoms: $AR_f$ is

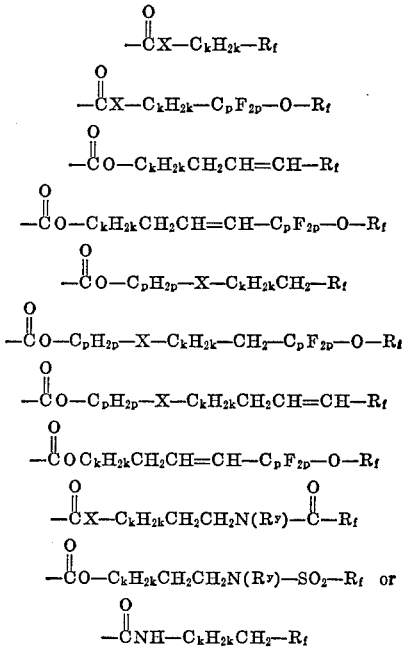

X is oxygen or sulfur;
$k$ is zero to 10;

TABLE 12

| Example number | Mercaptan G, parts | N-vinyl pyrrolidone, parts | N-methylol acrylamide, parts | AATCC oil repellency | | AATCC soil release | |
|---|---|---|---|---|---|---|---|
| | | | | 1 wash | 5 washes | 1 wash | 5 washes |
| 74 | 3.5 | 6.0 | 0.5 | 5 | 0 | 4.5 | 3 |
| 75 | 4.5 | 5.0 | 0.5 | 5 | 1 | 4 | 4 |
| 76 | 5.5 | 4.0 | 0.5 | 6 | 2.5 | 4.5 | 4 |
| 77 | 6.5 | 3.0 | 0.5 | 6 | 3.5 | 4 | 4.5 |
| 78 | 7.5 | 2.0 | 0.5 | 6 | 4.5 | 4 | 3 |

TABLE 13

| Example number | Rf-mercaptan-monomer mixture | | | Apperance of polymer solution | Solid-content [1] (theory 25%) | AATCC oil repellency | | AATCC soil release |
|---|---|---|---|---|---|---|---|---|
| | Mercaptan, parts | N-vinyl-pyrrolidone, parts | Comonomers, parts | | | Initial | 5 washes | 5 washes |
| 79 | 4.75 | 4.75 | Ethyl acrylate, 0.5 | Milky white | 25.26 | 6 | 2 | 3 |
| 80 | 4.75 | 4.75 | 2-ethylhexyl acrylate, 0.5 | do | 26.71 | 5 | 2 | 2 |
| 81 | 4.75 | 4.75 | Vinyl acetate, 0.5 | Clear blue | 25.95 | 6 | 2 | 3 |
| 82 | 4.75 | 4.75 | Polyethylene glycol dimethacrylate, 0.5 | Milky white | 26.14 | 6 | 2 | 4 |
| 83 | 4.75 | 4.75 | Octyl methacrylate, 0.5 | do | 26.74 | 5 | 2 | 2 |
| 84 | 4.75 | 4.75 | Diethyl maleate, 0.5 | Blue | 26.47 | 6 | 2 | 4 |
| 85 | 4.75 | 4.75 | Hydroxybutyl vinyl ether, 0.5 | do | 25.90 | 5 | 2 | 4 |

[1] The solid contents are slightly above the theoretical value due to acetone loss during sampling and weighing operations.

What is claimed is:

1. A polymer having water and oil repellent properties containing a moiety of the formula:

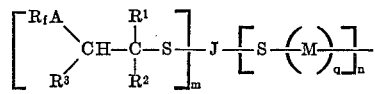

wherein
$R^1$, $R^2$, $R^3$ are hydrogen, methyl, $R_f A$ or $R_f ACH_2$ with the requirement at least one of $R^1$, $R^2$, $R^3$ represent $R_f A$ or $R_f ACH_2$;
$p$ is 2 to 12;
$R^y$ is hydrogen or alkyl of 1 to 4 carbon atoms;
$J$ is an inert linkage group;
$m$ is 1 to 10;
$n$ is 1 to 9.
$M$ is a repeating polymerizable group derived from an ethylenically unsaturated monomer and $q$ is an integer greater than one.

2. The polymer of claim 1 wherein $R_f$ contains 6 to 12 carbon atoms.

3. The polymer of claim 1 wherein said ethylenically unsaturated monomer includes acrylic acid, acrylate acrylamide, methacrylic acid, methacrylate, methacrylamide, vinyl ester, styrene, styrene substituted with alkyl, aryl or halogen, ethylene, ethylene substituted with halogen, cyano or alkyl, nitrogen vinyl monomer, butadiene or butadiene substituted with halogen or alkyl.

4. The polymer of claim 1 wherein M is derived from a combination of copolymerizable monomers including vinyl ether, $\alpha,\beta$-unsaturated diacid or anhydride, diester diamide, or imide thereof.

5. A polymer having oil and water repellent properties of the formula:

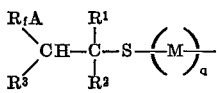

wherein
$R^1$, $R^2$, $R^3$ are hydrogen, methyl, $R_fA$ or $R_fACH_2$ with the requirement at least one of $R^1$, $R^2$, $R^3$ represent $R_fA$ or $R_fACH_2$;
$R_f$ is a perfluoroalkyl group 2 to 18 carbon atoms;
$AR_f$ is

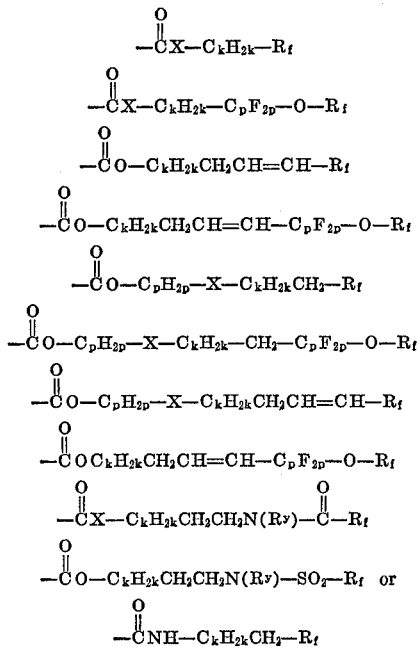

X is oxygen or sulfur;
$k$ is zero to 10;
$p$ is 2 to 12;
$R^y$ is hydrogen or alkyl of 1 to 4 carbon atoms;
M is a repeating polymerizable group derived from an ethylenically unsaturated monomer and $q$ is an integer greater than one.

6. The polymer of claim 5 wherein $R_f$ contains 6 to 12 carbon atoms.

7. The polymer of claim 5 wherein said ethylenically unsaturated monomer includes acrylic acid, acrylate, acrylamide, methacrylic acid, methacrylate, methacrylamide, vinyl ester, styrene, styrene substituted with alkyl, aryl or halogen, ethylene, ethylene substituted with halogen, cyano or alkyl, nitrogen-vinyl monomer, butadiene or butadiene substituted with halogen or alkyl.

8. The polymer of claim 5 wherein M is derived from a combination of copolymerizable monomers including vinyl ether, $\alpha$, $\beta$-unsaturated diacid or anhydride, diester diamide, or imide thereof.

9. A solid substrate coated with the polymer of claim 1.

10. The coated substrate of claim 9 wherein the substrate is a textile.

11. The coated substrate of claim 1 wherein $R_f$ contains 6 to 12 carbon atoms.

12. The polymer of claim 9 wherein said ethylenically unsaturated monomer includes acrylic acid, acrylate, acrylamide, methacrylic acid, methacrylate, methacrylamide, vinyl ester, styrene, styrene substituted with alkyl, aryl or halogen, ethylene, ethylene substituted with halogen, cyano or alkyl, nitrogen-vinyl monomer, butadiene or butadiene substituted with halogen or alkyl.

13. The polymer of claim 9 wherein M is derived from a combination of copolymerizable monomers including vinyl ether, $\alpha,\beta$-unsaturated diacid or anhydride, diester diamide, or imide thereof.

14. A solid substrate coated with the polymer of claim 5.

15. The coated substrate of claim 14 wherein the substrate is a textile.

16. The coated substrate of claim 14 wherein $R_f$ contains 6 to 12 carbon atoms.

17. The polymer of claim 14 wherein said ethylenically unsaturated monomer includes acrylic acid, acrylate, acrylamide, methacrylic acid, methacrylate, methacrylamide, vinyl ester, styrene, styrene substituted with alkyl, aryl or halogen, ethylene, ethylene substituted with halogen, cyano or alkyl, nitrogen-vinyl monomer, butadiene or butadiene substituted with halogen or alkyl.

18. The polymer of claim 14 wherein M is derived from a combination of copolymerizable monomers including vinyl ether, $\alpha,\beta$-unsaturated diacid or anhydride, diester diamide, or imide thereof.

References Cited
UNITED STATES PATENTS

| | | | |
|---|---|---|---|
| 3,594,353 | 7/1971 | Domba | 260—78.4 |
| 3,575,940 | 4/1971 | Katsushima et al. | 260—78.4 |
| 3,636,085 | 1/1972 | Kleiner | 260—485 F |
| 2,396,997 | 3/1946 | Fryling | 260—83 |

JOSEPH L. SCHOFER, Primary Examiner

J. KIGHT, Assistant Examiner

U.S. Cl. X.R.

117—132 CF, 139.5 A, 161 UC; 260—78.4 E, 78.5 BB, E, HC, Cl, 79, 79.7, 80 P, 83.5, 85.5 ES, 85.7, 86.1 E, R, 89.5